US008687844B2

(12) United States Patent
Choe

(10) Patent No.: US 8,687,844 B2
(45) Date of Patent: Apr. 1, 2014

(54) VISUAL DETECTION SYSTEM FOR IDENTIFYING OBJECTS WITHIN REGION OF INTEREST

(75) Inventor: Howard C. Choe, Southlake, TX (US)

(73) Assignee: Raytheon Company, Waltham, MA (US)

( * ) Notice: Subject to any disclaimer, the term of this patent is extended or adjusted under 35 U.S.C. 154(b) by 969 days.

(21) Appl. No.: 12/483,100

(22) Filed: Jun. 11, 2009

(65) Prior Publication Data

US 2014/0064578 A1 Mar. 6, 2014

Related U.S. Application Data

(60) Provisional application No. 61/061,482, filed on Jun. 13, 2008, provisional application No. 61/061,472, filed on Jun. 13, 2008, provisional application No. 61/137,656, filed on Aug. 1, 2008.

(51) Int. Cl.
*G06K 9/00* (2006.01)

(52) U.S. Cl.
USPC ........... 382/103; 382/181; 382/190; 382/209; 382/224; 706/10; 706/15; 706/16; 706/20

(58) Field of Classification Search
None
See application file for complete search history.

(56) References Cited

U.S. PATENT DOCUMENTS

| 5,035,472 | A |   | 7/1991  | Hansen   |         |
|-----------|---|---|---------|----------|---------|
| 5,583,795 | A | * | 12/1996 | Smyth    | 702/150 |
| 5,649,061 | A | * | 7/1997  | Smyth    | 706/16  |
| 6,020,994 | A |   | 2/2000  | Cook     |         |
| 6,061,182 | A |   | 5/2000  | Carmeli et al. | 359/629 |
| 6,092,058 | A | * | 7/2000  | Smyth    | 706/10  |
| 6,120,461 | A | * | 9/2000  | Smyth    | 600/558 |
| 6,445,832 | B1| * | 9/2002  | Lee et al. | 382/266 |
| 6,727,939 | B1|   | 4/2004  | Stekelenburg | 348/158 |

(Continued)

FOREIGN PATENT DOCUMENTS

EP  1 056 270  11/2000

OTHER PUBLICATIONS

Toet, "Gaze directed displays as an enabling technology for attention aware systems", Jul. 2006, Computers in Human Behavior, vol. 22, Issue 4, pp. 615-647.*

(Continued)

*Primary Examiner* — Matthew Bella
*Assistant Examiner* — Jason Heidemann
(74) *Attorney, Agent, or Firm* — Christie, Parker & Hale, LLP

(57) ABSTRACT

According to one embodiment, a visual detection system includes an image processing unit coupled to a display and one or more neuro-physiological sensors. The display generates an image that may be viewed by a user. The neuro-physiological sensors generate neuro-physiological signals representing neuro-physiological characteristics of the user while viewing the display. The image processing unit receives the neuro-physiological signals from the neuro-physiological sensors, determines a region of interest in the image according to the neuro-physiological signals, and provides an indication of the presence of the region of interest in the image.

24 Claims, 3 Drawing Sheets

(56) References Cited

U.S. PATENT DOCUMENTS

| | | | |
|---|---|---|---|
| 6,778,211 | B1 | 8/2004 | Zimmermann et al. ...... 348/218 |
| 7,307,793 | B2 | 12/2007 | Ottney et al. ................. 359/634 |
| 7,312,820 | B2 | 12/2007 | Zimmermann et al. ...... 348/218 |
| 7,492,962 | B2 | 2/2009 | Zhang et al. .................. 382/274 |
| 2004/0094700 | A1 | 5/2004 | Filipovich |
| 2006/0200013 | A1* | 9/2006 | Smith et al. ................... 600/319 |
| 2006/0238877 | A1 | 10/2006 | Ashkenazi et al. |
| 2007/0104369 | A1* | 5/2007 | Weatherhead ................ 382/181 |
| 2008/0036875 | A1 | 2/2008 | Jones et al. |
| 2008/0162389 | A1* | 7/2008 | Aboutalib ....................... 706/15 |
| 2009/0058660 | A1 | 3/2009 | Torch ............................ 340/573 |
| 2009/0146775 | A1 | 6/2009 | Bonnaud et al. ............. 340/3.1 |
| 2009/0149257 | A1 | 6/2009 | Ferguson et al. .............. 463/37 |
| 2009/0150919 | A1 | 6/2009 | Lee et al. ....................... 725/10 |

OTHER PUBLICATIONS

Gibbs, "Northrop Grumman-Led Team Awarded Contract to Develop Electronic Binoculars That Use Brain Activity to Detect Threats", Northrop Grumman, Published-Jun. 9, 2008, [online] [Retrieved on Dec. 14, 2012] Internet <URL: http://www.es.northropgrumman.com/news/2008/06/>.*

Angel et al., "Review of Fusion Systems and Contributing Technologies for SIHS", Human-systems, Incorporated, Mar. 31 2007.*

Hu et al., "A Survey on Visual Surveillance of Object Motion and Behaviors", Aug. 2004, IEEE Transactions on Systems, Man, and Cybernetics vol. 34, No. 3, pp. 334-352.*

Notification of Transmittal of The International Search Report and the Written Opinion of the International Searching Authority (EP), or the Declaration; for PCT/US2009/047169 (13 pages), Aug. 20, 2009.

* cited by examiner

VISUAL DETECTION SYSTEM FOR IDENTIFYING OBJECTS WITHIN REGION OF INTEREST

RELATED APPLICATIONS

This application claims priority to U.S. Provisional Patent Application Ser. No. 61/061,482, entitled "COMPOSITE COGNITIVE, BIOMIMETIC, AND NEUROMIMETIC PROCESSING," which was filed on Jun. 13, 2008. U.S. Provisional Patent Application Ser. No. 61/061,482 is hereby incorporated by reference.

This application claims priority to U.S. Provisional Patent Application Ser. No. 61/061,472, entitled "HAND-HELD WIDE AREA THREAT WARNING DEVICE," which was filed on Jun. 13, 2008. U.S. Provisional Patent Application Ser. No. 61/061,472 is hereby incorporated by reference.

This application claims priority to U.S. Provisional Patent Application Ser. No. 61/137,656, entitled "HAND-HELD WIDE AREA THREAT WARNING DEVICE," which was filed on Aug. 1, 2008. U.S. Provisional Patent Application Ser. No. 61/137,656 is hereby incorporated by reference.

TECHNICAL FIELD OF THE DISCLOSURE

This disclosure generally relates to optical devices, and more particularly, to a visual detection system having an image processing unit for the detections of various regions of interest.

BACKGROUND OF THE DISCLOSURE

Visual aid devices, such as binoculars or night vision viewing devices provide imagery of objects that may difficult to detect with the naked eye. Some visual aid devices may include video cameras that generate an electrical signal representative of an object and a display that converts the electrical signal into an image to be viewed by its user. Visual aid devices such as these may include image processing systems that perform various algorithms on the electrical signal, such as fast Fourier transforms (FFTs), to increase the sharpness or other characteristics of the generated image.

SUMMARY OF THE DISCLOSURE

According to one embodiment, a visual detection system includes an image processing unit coupled to a display and one or more neuro-physiological sensors. The display generates an image that may be viewed by a user. The neuro-physiological sensors generate neuro-physiological signals representing neuro-physiological characteristics of the user while viewing the display. The image processing unit receives the neuro-physiological signals from the neuro-physiological sensors, determines a region of interest in the image according to the neuro-physiological signals, and provides an indication of the presence of the region of interest in the image.

Particular embodiments of the present disclosure may exhibit some, none, or all of the following technical advantages. For example, an advantage of one embodiment may be a visual detection system that may provide users, such as soldiers with a portable visual threat warning system. The visual detection system may improve force protection and enhance persistent situational awareness by detecting threats at stand-off range giving earlier auto warnings/alerts, and reducing fatigue in searching for threats compared to known visual aid devices, such as binoculars.

Other technical advantages will be readily apparent to one skilled in the art from the following figures, description, and claims.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Visual aid devices may incorporate a video camera that generates an electrical signal and a display that converts the electrical signal into an image for view by a user. Devices such as these may include image enhancement systems that manipulate the electrical signal to enhance the resulting image presented on its display. These devices, however, do not provide detection of certain regions of interest within the image using one or more neuro-physiological characteristics of the viewer.

Figure 1:
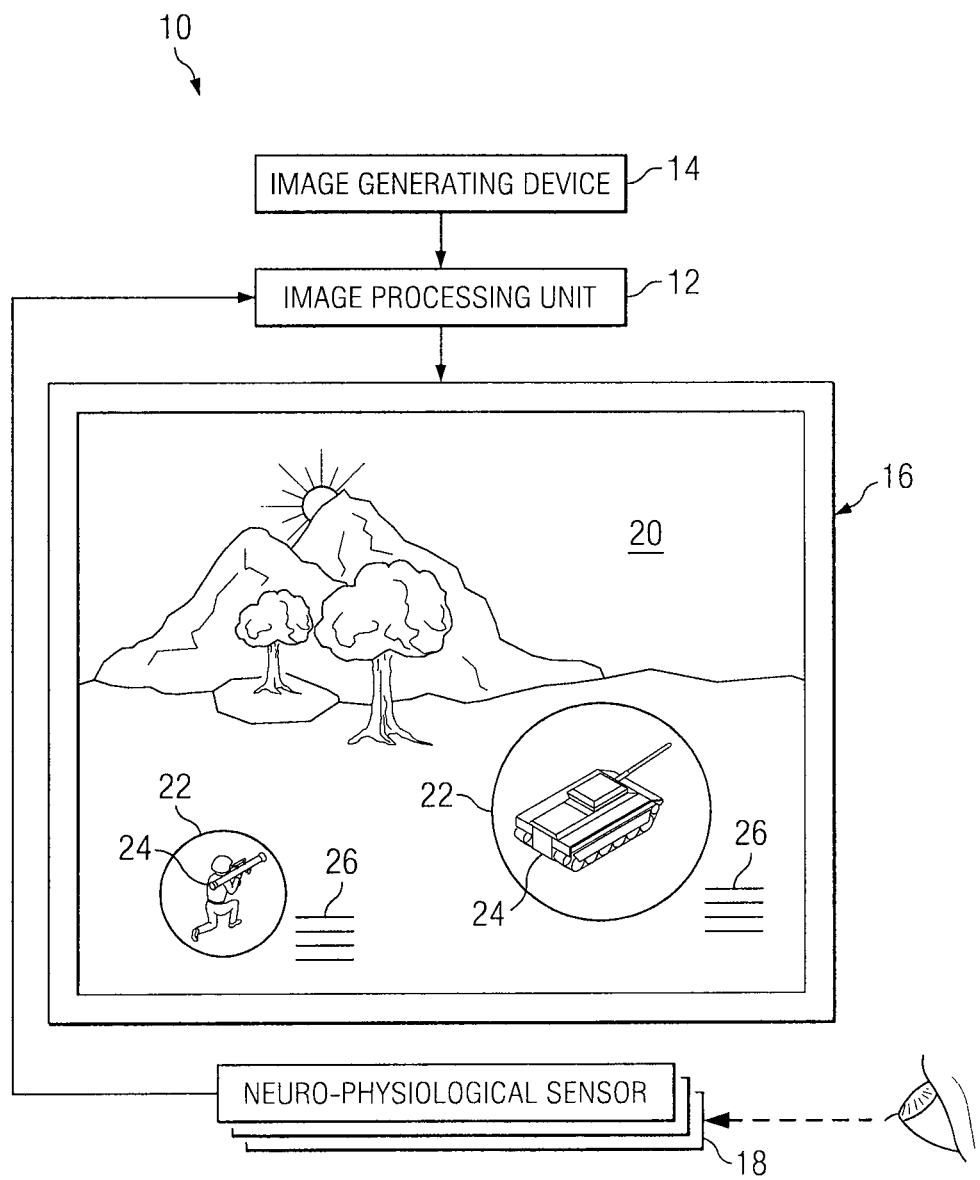
FIG. 1 is a diagram showing one embodiment of a visual detection system according to the teachings of the present disclosure.

FIG. 1 is a diagram showing one embodiment of a visual detection system 10 according to the teachings of the present disclosure. Visual detection system 10 includes an image processing unit 12 coupled to an image generating device 14, a display 16, and one or more neuro-physiological sensors 18 as shown. Image generating device 14 generates an electrical signal that is processed by image processing unit 12 and subsequently converted by display 16 into an image 20. Neuro-physiological sensors 18 generate neuro-physiological signals that represent neuro-physiological characteristics of a user viewing image 20. Image processing unit 12 uses the electrical signal along with neuro-physiological signals from neuro-physiological sensors 18 to detect one or more regions of interest 24 in image 20 and provide an indicator 22 of the determined regions of interest 24 for the user.

A region of interest 24 may include any portion of image 20 or all of image 20 that may be identified by image processing unit 12 using signals from neuro-physiological sensors 18. In the particular example image shown on display 16, regions of interest 24 include a person and a military tank. Identification of regions of interest 24 by image processing unit 12 will be described in detail below.

Image processing unit 12 determines regions of interest 24 using neuro-physiological signals from neuro-physiological sensors 18. Neuro-physiological sensors 18 may include any quantity and type that monitor various neuro-physiological aspects of the user viewing display 16. In one embodiment, one neuro-physiological sensor 18 includes an electro-encephalogram (EEG) sensor that monitors brain wave activity of its user. In another embodiment, one neuro-physiological sensor 18 includes an eye tracker camera that monitors the orientation and/or dilation of the user's eye to determine regions of interest 24. Other types of neuro-physiological aspects monitored by neuro-physiological sensors 18 may include the user's heart rate, respiration, perspiration, posture, or body temperature. Image processing unit 12 receives signals from neuro-physiological sensors 18 and processes the received signals to derive neuro-physiological information about the user that may be related to objects viewed in display 16.

Indicators 22 indicate particular regions of interest 24 to the user. Although the indicators 22 shown are pixel patterns in the form of circular icons that are displayed proximate their associated region of interest 24 on display 16, other types of indicators may include any suitable visual and/or audible indication of the presence of a detected region of interest 24 on display 16. In another embodiment, each indicator 22 may include a caption portion 26 including information in the form of alpha-numeric text displayed proximate its associated circular or other suitable indicator icon. Caption portion 26 may include information about its associated region of interest 24 that is generated by image processing unit 12.

Image generating device 14 may be any source of video information provided to image processing unit 12. In one embodiment, image generating device 14 is a video camera that provides video information to image processing unit 12 in real-time. In other embodiments, image generating device may be a storage device, such as a magnetic hard disk that stores video information and provides the video information to image processing unit 12 on demand.

Figure 2A:
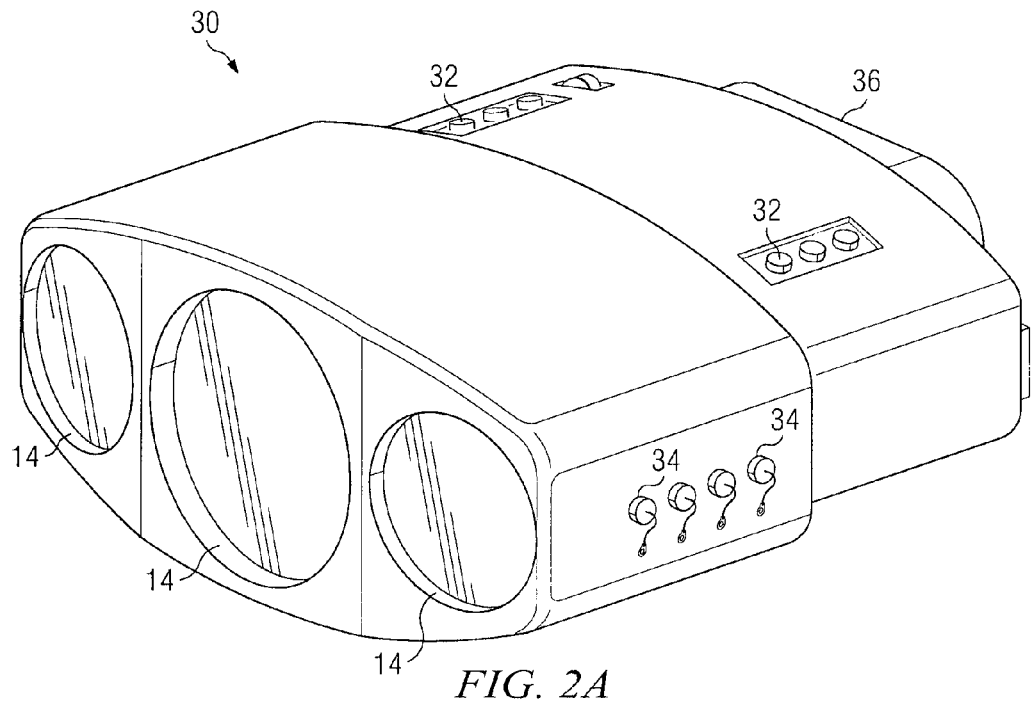
FIGS. 2A and 2B are a front perspective view and a rear perspective view, respectively, of one embodiment of a housing that may be used to house the various elements of the visual detection system of FIG. 1.
Figure 2B:
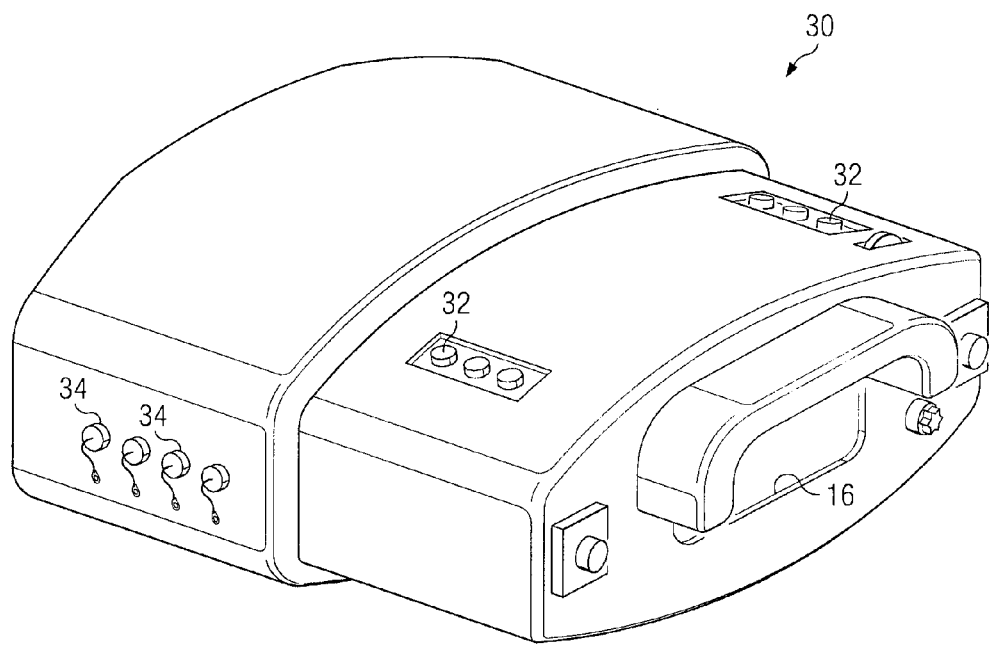

FIGS. 2A and 2B show a front perspective view and a rear perspective view, respectively, of one embodiment of a housing 30 that may be used to house the various elements of visual detection system 10. Housing 30 houses image generating devices 14, display 16, several function buttons 32, and several connectors 34 that may be used to couple neuro-physiological sensors 18 to image processing unit 12 configured inside. In one embodiment, housing 30 is configured to be handled by the hands of its user and is approximately 1.0 foot wide by 1.0 foot long by 0.5 feet in depth. Housing 30 may also include a visor 36 that extends outwardly from housing 30 proximate display 16 for reduced glare during daytime viewing.

In the particular embodiment shown, multiple image generating devices 14 are configured in housing 30. The images generated by the multiple image generating devices 14 may be stitched together in a contiguous fashion on the display 16 to provide a relatively wide field-of-view. That is, images generated by multiple image generating devices 14 may be contiguously aligned with one another along their lateral extent to form a panoramic view on display 16. In one embodiment, three image generating devices 14 may be provided in which the electrical signal from the centrally configured image generating device 14 is processed by image processing unit 12. In this manner, the centrally configured image generating device 14 may detect regions of interest 24 while the two outer image generating devices 14 provide a relatively wide field-of-view for the user.

Figure 3:
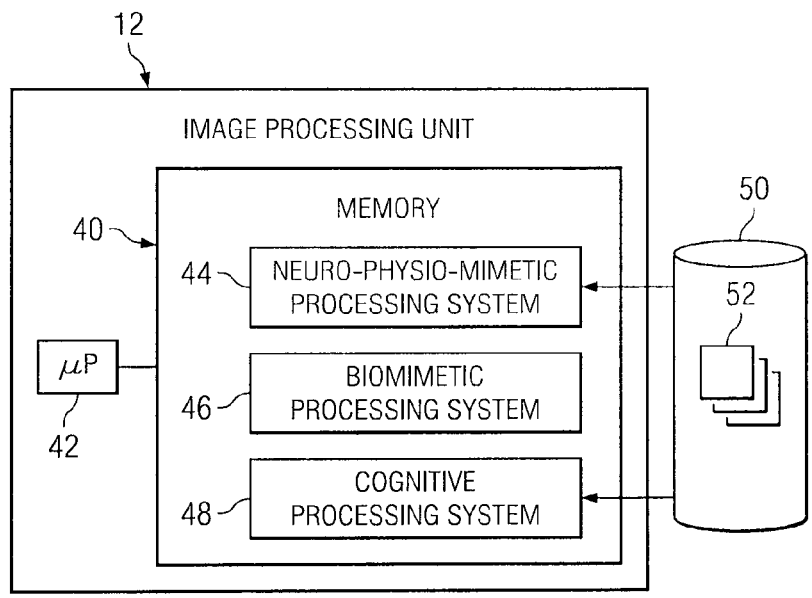
FIG. 3 is a diagram showing one embodiment of the image processing unit of FIG. 1.

FIG. 3 is a diagram showing one embodiment of the image processing unit 12 of FIG. 1. Image processing unit 12 includes a processor 42 executing a neuro-physio-mimetic processing system 44, a biomimetic processing system 46, and a cognitive processing system 48 that are stored in a memory 48. Neuro-physio-mimetic processing system 44 and cognitive processing system 48 are coupled to a mass storage device 50 that stores records 52 having information associated with particular users and/or image features of objects that may be viewed by visual detection system 10.

Various combined operations of neuro-physio-mimetic processing system 44, biomimetic processing system 46, and cognitive processing system 48 may be used by visual detection system 10 to detect regions of interest 24 on display 16.

Neuro-physio-mimetic processing system 44 is coupled to one or more neuro-physiological sensors that monitor various neuro-physiological aspects of the user. For example, one neuro-physiological sensor may include an electro-encephalogram (EEG) sensor that monitors brain wave activity of its user. Other types of neuro-physiological aspects monitored by neuro-physiological sensors may include the user's heart rate, respiration, perspiration, posture, or body temperature. Neuro-neuro-physio-mimetic processing system 44 receives signals from neuro-physiological sensors 18 and processes the received signals to derive neuro-physiological information about the user that may be related to objects viewed on display 16.

Neuro-physio-mimetic processing system 44 determines the existence of regions of interest 24 according to particular neuro-physiological characteristics of the user when viewing display 16. Each user of visual detection system 10, however, may react differently to the observed presence of certain objects shown on display 16. Thus, records 52 stored in mass storage device 50 may include neuro-physiological information uniquely associated particular users. During operation, neuro-physio-mimetic processing system 44 may access these records 52 and combine its information with received information received from neuro-physiological sensors 18 to determine regions of interest 24.

Biomimetic processing system 46 may be coupled to a particular type of neuro-physiological sensor 18 referred to as an eye tracking camera that associates eye activity of the user with imagery displayed on display 16. Biomimetic processing system 46 receives signals from the eye tracker camera and determines various characteristics of the user's eye, such as its orientation and/or pupil dilation. The eye information may be combined with information provided by neuro-physio-mimetic processing system 44 to determine regions of interest 24.

Cognitive processing system 48 receives electrical signals from image generating device 14 and neuro-physiological signals from neuro-physiological sensors 18 for determining information about objects displayed on display 16. That is, cognitive processing system 48 may associate particular neuro-physiological aspects of the user or actions of the eye of user with imagery displayed on display 16 to determine regions of interest 24. For example, a particular object, such as a military tank may be rendered on display 16. When viewed, the eye may develop a momentary orientation toward the military tank. Biomimetic processing system 46 processes this information to generate a visible marker that is displayed on display 16 proximate the location of the military tank. In this manner, optical instrument 10 may provide a warning mechanism for particular objects that, in some cases, may be faster than provided through normal cognitive thought processes of the user in some embodiments.

In one embodiment, mass storage device 50 stores records 52 including image features of objects that may be useful to the user. For example, records 52 may store image features of various military objects, such as tanks, aircraft, or armament in records 52. When imagery is received by cognitive processing system 48, these records 52 may be accessed to determine the presence of these military objects in the image shown on display 16.

Image processing unit 12 mimics the performance of human neuro-physiological processes, such as visual system processing, neural feature extraction processing, and sensorimotor integration including expert cognitive processing in some embodiments. Cognitive processing system 48 and biomimetic processing system 46, for example, may be used to extract visual features in image by analyzing the images using image features and expert knowledge. The extracted visual features, for example, may be edges, shapes, colors, and other visual cognitive features that may be used to determine regions of interest 22.

Using an electro-encephalogram neuro-physiological sensor 18, neuro-physio-mimetic processing system 44 may detect event-related evoked response potentials (ERPs) in a user's brainwaves in an operational environment in real-time. The event-related evoked response potentials encode sensory, motor and cognitive processes associated with visual responses to task relevant stimuli in the human brain of the user. Neuro-physio-mimetic processing system 44 extracts this information from the image, which may include finding and recognizing the objects and/or features in natural imagery which may draw the user's attention.

Figure 4:
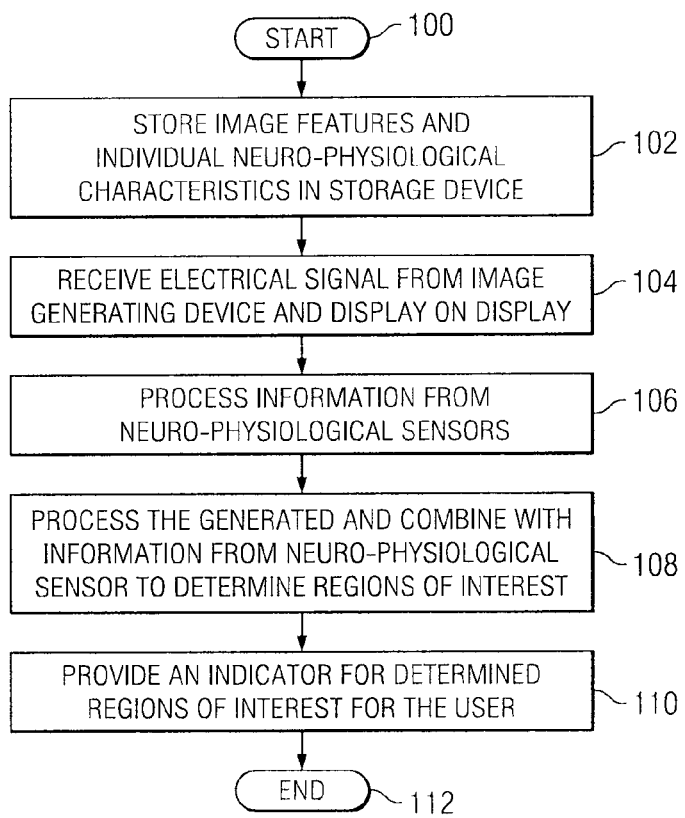
FIG. 4 is a flowchart showing one embodiment of a series of actions that may be performed by image processing unit of FIG. 3 to determine one or more regions of interest on the display.

FIG. 4 is a flowchart showing one embodiment of a series of actions that may be performed by image processing unit 12 to determine one or more regions of interest 24 on display 16. In act 100, the process is initiated.

In act 102, image features neuro-physiological characteristics may be stored in mass storage device 50. Image features may be associated with particular objects that may be of interest to the user while neuro-physiological characteristics may be associated with particular individuals who may use visual detection system 10.

In act 104, image processing unit 12 receives the electrical signal representing various objects within the field-of-view of image generating device 14. In one embodiment image generating device 14 is a video camera that generates a video signal that is displayed on display 16.

In act 106, biomimetic processing system 46 and neuro-physio-mimetic processing system 44 process information from neuro-physiological sensors 18. Neuro-physiological sensors 18 may include any type of sensor that monitors various neuro-physiological aspects of the user viewing display 16. In one embodiment, one neuro-physiological sensor 18 includes an electro-encephalogram (EEG) sensor that monitors brain wave activity of its user. In another embodiment, neuro-physiological sensor 18 is an eye tracker camera that monitors the orientation and/or dilation of the user's eye to determine regions of interest 24.

Region of interest 24 detection in a visual scene may be analogous to a person reaching into a pocket to retrieve a car key. One reaches into the pocket and manipulates the key with sensory surfaces to use cutaneous and proprioceptive information to locate and identify the correct object based upon key features. In one embodiment, biomimetic processing system 46 uses a similar hypothesis-driven, integrative sensorimotor search process to identify potential targets in a complex visual scene by sensing movements of the retina with high acuity at the fovea and optic flow detection peripherally to sample information regarding objects of interest. These actions are implemented by coordinated activity in the visual sensor thalamocortical (e.g., geniculostriate) pathways for sensory processing, sensorimotor integration (associative cortical and limbic) pathways, and oculomotor control pathways (e.g., frontal eye fields, superior parietal cortex, superior colliculus and the oculomotor structure) to identify and locate the objects of interest (and relationships between objects of interest) in the user's field-of-view.

In one embodiment in which neuro-physiological sensor 18 is an electro-encephalogram sensor, neuro-physio-mimetic processing system 44 captures and classifies episodic events in multi-channel neuronal firing data paths for on-line, real-time, brain-to-system feedback and monitoring. These multiple information paths in neuro-physio-mimetic processing system 44 provide checks and balances among one another. Even if one information path fails or yields conflicting/ambiguous information, the other paths may remain active and carry out the neuromimetic processing tasks. These paths, therefore, may mitigate each other from failure.

In act 108, cognitive processing system 48 processes the image on display 16 with information from biomimetic processing system 46 and neuro-physio-mimetic processing system 44 to determine regions of interest 24. Cognitive processing system 48 synthesizes information from image on display 16 with information from biomimetic processing system 46 that may include, foveal and non-foveal visual stimuli of the eye of the user, cognitive state (attention and importance) of the user, sensorimotor integration (eye movement planning and programming) and movement execution, and eye position.

In a particular embodiment incorporating an electro-encephalogram sensor, two processing paths may be generated: (1) a subspace signature extraction path and (2) a memory encoding path. The display processor and the biomimetic processing system 46 may extract the foveal image features and its pixel parameters in real-time for both visual object signature recognition and interpretation of electro-encephalogram signals. The integral eye tracker camera provides the foveal fixation path in real-time, indicating whether foveal fixation location and duration exceeded threshold criteria, which in turn, may provide additional information about the user's focused visual attention and vigilance. The output signal from the electro-encephalogram subspace signature extraction path, the electro-encephalogram memory encoding path, and the biomimetic foveal image path are each compared to information stored in records to match objects with potential regions of interest 24.

The output of neuro-physio-mimetic processing system 48 may include an event/no-event determination of any potential regions of interest 24. The event/no-event determination may be determined according to thresholds applied to signals from each neuro-physiological sensor 18 and detected objects derived by biomimetic processing system 46. The even/no-event determination may include an associated confidence level. In one embodiment, cognitive processing system 48 may interrogate biomimetic processing system 46 and/or neuro-physio-mimetic processing system 44 for specific information to refine its determination.

In act 110, image processing unit 12 provides an indicator of the detected region of interest 24. In one embodiment, indicator is a pixel pattern in the form of circular icon that is displayed proximate their associated region of interest 24 on display 16. In one embodiment, the confidence level determined in act 108 may be included in the caption portion 26 of indicator 22.

The previously described acts 102 through 110 continue throughout operation of visual detection system 10. In act 112, the process ends.

Modifications, additions, or omissions may be made to visual detection system 10 without departing from the scope of the disclosure. The components of visual detection system 10 may be integrated or separated. For example, image generating device 14, image processing unit 12, and display 16 may be provided in a single housing 30 as shown in FIGS. 2A and 2B or may be provided as independently housed units. Moreover, the operations of visual detection system 10 may be performed by more, fewer, or other components. For example, image processing unit 12 may include other components, such as filtering mechanisms that sharpen the image or provide other imaging filtering techniques to the generated image. Additionally, operations of image processing unit 12 may be performed using any suitable logic comprising software, hardware, and/or other logic.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A visual detection system comprising:
an image processing unit coupled to a display operable to generate an image of a scene being viewed and a neuro-physiological sensor configured to generate a neuro-physiological signal representing a neuro-physiological characteristic of a user viewing the display, the image processing unit operable to:
receive the neuro-physiological signal from the neuro-physiological sensor;
capture and classify episodic events in the neuro-physiological signal, in multi-channel neuronal paths;
determine a region of interest in the scene according to information in the neuronal paths;
provide, using an indicator, an indication of the presence of the region of interest in the scene;
extract visual features from within the region of interest; and
identify an object within the region of interest by analyzing the visual features.

2. The visual detection system of claim 1, wherein the neuro-physiological sensor comprises an eye tracker camera operable to generate the neuro-physiological signal that is indicative of an orientation of an eye of the user, the image processing unit operable to:
associate the orientation of the eye with the region of interest;
associate a dilation of a pupil of the eye with the user's focus and attention; and
display the indicator on the display proximate the region of interest.

3. The visual detection system of claim 1, wherein the image processing unit comprises a storage device operable to store a plurality of image features that are each associated with an object of interest, the image processing unit operable to identify the object within the region of interest by comparing the visual features with the plurality of image features.

4. The visual detection system of claim 1, wherein the neuro-physiological sensor comprises an electro-encephalogram sensor.

5. The visual detection system of claim 1, wherein the neuro-physiological sensor is selected from the group consisting of a heart rate monitor, a respiration monitor, a perspiration monitor, a posture monitor, or a thermometer.

6. The visual detection system of claim 1, wherein the indicator comprises a pixel pattern that is displayed proximate the region of interest on the display.

7. The visual detection system of claim 1, wherein the indicator comprises a caption portion including information associated with the region of interest.

8. The visual detection system of claim 7, further comprising a hand-held housing that houses the video camera, the display, and the image processing unit, the hand-held housing operable to be handled by the hands of the user.

9. A visual detection method comprising:
receiving a neuro-physiological signal from a neuro-physiological sensor, the neuro-physiological signal representing a neuro-physiological characteristic of a user viewing an image of a visual scene on a display;
capturing and classifying episodic events in the neuro-physiological signal, in multi-channel neuronal paths;
determining a region of interest in the visual scene according to information in the neuronal paths;
providing, using an indicator, an indication of the presence of the region of interest in the scene;
extract visual features from within the region of interest; and
identifying an object within the region of interest by analyzing the visual features.

10. The method of claim 9, further comprising:
associating an orientation of the eye with the region of interest in the image using a neuro-physiological sensor comprising an eye tracker camera;
associating a dilation of a pupil of the eye with the user's focus and attention using the eye tracker camera; and
displaying the indicator on the display proximate the region of interest.

11. The method of claim 9, wherein identifying the object comprises comparing the visual features with a plurality of image features stored in a mass storage device.

12. The method of claim 9, wherein determining the region of interest comprises determining the region of interest according to a neuro-physiological sensor comprising an EEG sensor.

13. The method of claim 9, wherein the neuro-physiological sensor is selected from the group consisting of a heart rate monitor, a respiration monitor, a perspiration monitor, a posture monitor, or a thermometer.

14. The method of claim 9, wherein displaying the indicator on the display comprises displaying a pixel pattern proximate the region of interest on the display.

15. The method of claim 9, wherein displaying the indicator on the display comprises displaying a caption portion including information associated with the region of interest on the display.

16. The method of claim 15, wherein the video camera, display, and a processing system that determines the region of interest are housed in a housing.

17. A non-transitory computer-readable medium, storing code executable by a processor, the code being operable to perform at least the following:
receive a neuro-physiological signal from a neuro-physiological sensor, the neuro-physiological signal representing a neuro-physiological characteristic of a user viewing an image of a visual scene on a display;
capture and classify episodic events in the neuro-physiological signal, in multi-channel neuronal paths;
determine a region of interest in the visual scene according to information in the neuronal paths;
provide, using an indicator, an indication of the presence of the region of interest in the scene;
extract visual features from within the region of interest; and
identify an object within the region of interest by analyzing the visual features.

18. The non-transitory computer-readable medium of claim 17, wherein the code is further operable to:
associate the orientation of the eye with the region of interest using a neuro-physiological sensor comprising an eye tracker camera;

associate a dilation of a pupil of the eye with the user's focus and attention using the eye tracker camera; and display the indicator on the display proximate the region of interest.

19. The non-transitory computer-readable medium of claim 17, wherein identifying the object comprises comparing the visual features with a plurality of image features stored in a mass storage device.

20. The non-transitory computer-readable medium of claim 17, wherein determining the region of interest comprises determining the region of interest according to a neuro-physiological sensor comprising an electro-encephalogram sensor.

21. The non-transitory computer-readable medium of claim 17, wherein the neuro-physiological sensor is selected from the group consisting of a heart rate monitor, a respiration monitor, a perspiration monitor, a posture monitor, or a thermometer.

22. The non-transitory computer-readable medium of claim 17, wherein displaying the indicator on the display comprises displaying a pixel pattern proximate the region of interest on the display.

23. The non-transitory computer-readable medium of claim 17, wherein displaying the indicator on the display comprises displaying a caption portion including information associated with the region of interest on the display.

24. The non-transitory computer-readable medium of claim 23, wherein the video camera, display, and a processing system that determines the region of interest are housed in a housing.

* * * * *